United States Patent [19]

Raghava

[11] Patent Number: 4,784,898
[45] Date of Patent: Nov. 15, 1988

[54] HIGH SONAR TRANSMISSION COMPOSITION

[75] Inventor: Ram S. Raghava, Hudson, Ohio

[73] Assignee: The B. F. Goodrich Company, Akron, Ohio

[21] Appl. No.: 109,007

[22] Filed: Oct. 13, 1987

[51] Int. Cl.$^4$ .............................................. D03D 3/00
[52] U.S. Cl. .................... 428/225; 428/246; 428/251; 428/257; 428/284; 428/285; 428/286; 428/288; 428/413; 428/414; 428/415; 428/421; 428/408; 428/902
[58] Field of Search ............... 428/288, 408, 902, 413, 428/285, 246, 251, 257, 225, 286, 284, 414, 415, 421

[56] References Cited

U.S. PATENT DOCUMENTS 4,197,920  4/1980  Cluzel et al. ........................ 181/175
4,596,736  6/1986  Eichhorn et al. ................... 428/298
4,600,643  7/1986  Dwulet .............................. 428/375
4,613,535  9/1986  Harpell et al. ..................... 428/113
4,690,860  9/1987  Radvan et al. ..................... 428/290

Primary Examiner—James J. Bell
Attorney, Agent, or Firm—James R. Lindsay; Daniel J. Hudak

[57] ABSTRACT

Plastic compositions having good sonar transmission, that is low loss of sound transmission, are a composite of a low loss sonar material, for example polyethylene, and a high tensile strength material, for example fiberglass, adhered together by a binder, for example an epoxy. The composite generally has a tensile strength of greater than 100,000 PSI. The composites unexpectantly have a lower sound level loss than would be expected based upon a linear proportion of the amount of high flexural strength material contained therein.

21 Claims, No Drawings 4,784,898

HIGH SONAR TRANSMISSION COMPOSITION

FIELD OF THE INVENTION

The present invention relates to the transmission of sonar through composites which unexpectantly produce very little sound level loss. More specifically, the present invention relates to composites of high strength materials and low loss sonar transmission materials contained in a binder.

BACKGROUND

U.S. Pat. No. 4,197,920 to Cluzel, et al, relates to underwater acoustical reflectors and to a method for making the same whereby electrodes are immersed in an electrolyte solution and thereafter connected to an electrical current. The electrodes are selected such that bubbles form and at least one of the electrodes provides a layer of acoustical reflective bubbles. The patent does note the plates can be made of a rigid plastic material which is substantially acoustically transparent, for example polyethylene.

U.S. Pat. No. 4,600,643 to Dwulet relates to a composite yarn product having improved strength and resistance to distortion and fracture made from strands of a composite resin laminate prepared from at least three film layers. The film layers are bounded together by an adhesive composition. The three film layers can be made from polymers such as polyester, polyolefin, polyvinyl chloride, and the like.

U.S. Pat. No. 4,613,535 to Harpell relates to a composite article having improvded impact resistance made from a network of high strength fibers having a tensile modulus of at least 160 grams/denier and a tenacity of at least about 7 grams/denier. The network of high strength fibers is made from various materials such as ultra high molecular weight polyethylene fiber, ultra high molecular weight polypropylene fiber, armide fiber, polyvinyl alcohol fiber, and combinations thereof. The composite is utilized as a material having an improved ballistic resistance.

SUMMARY OF THE INVENTION

It is therefore an object of the present invention to provide a plastic combination which has high sonar transmission therethrough. A material, generally in the form of fibers which has high acoustical transmission properties such as polyethylene, is utilized. A high tensile strength material, as in fiber form, is utilized such a fiberglass, aramid, and the like. Such fibers can be contained in generally any combination such as any weave composed of both fibers, or in clusters, that is one or more weaves, layers, etc. of one material which is located adjacent to one or more weaves, layers, etc. of the remaining material. A relatively rigid or strong binder, which is processable and cures at a temperature below the melting point of the high sonar transmission material (for example below 250° F. for polyethylene), is utilized to adhere the fibers together and form the composite. The composite tends to have good flexural and other mechanical properties (e.g., fatigue resistance, compression and impact resistance) since the polyethylene shrinks upon heating whereas the fiberglass expands upon the heating. The invention will be better understood by reference to the following detailed description.

DETAILED DESCRIPTION OF THE INVENTION

The high acoustical transmission material of the present invention is generally a polymer which has a low polarity. Desirably, the material has good transmission, that is a low sound level loss, with regard to sonar waves which can have a frequency range from kilocycles to megacycles. At 100 kilohertz, the loss in decibels is less than 0.5 and desirably less than 0.2 decibels. An example of such a suitable and a preferred material is polyethylene such as ultra high molecular weight polyethylene having a molecular weight of at least 500,000, desirably at least 1 million, with a range of from about 2 million to about 5 million being preferred. Such ultra high molecular weight polyethylene is available under the brand name of Spectra manufactured by Allied Chemical Corporation. Another suitable high transmission sonar material is polytetrafluoroethylene.

The shape or form of the high transmission material or polymer can vary and can thus be a solid, for example a sheet of material, but preferably is a fiber as in the form of a woven fabric, etc.

The high sonar transmission materials are utilized in association with high tensile strength materials and fabricated with a binder into structures, housings, articles, etc., where it is desired that sonar be transmitted therethrough. Examples of such suitable high strength materials include fiberglass, aramid, carbon or graphite fibers, and the like. Such materials are generally in the form of fibers although they can be utilized in sheet form, etc. Desirably the high tensile strength materials have a tensile strength of at least 200,000 psi, desirably at least 300,000 psi, and preferably at least 400,000 psi.

A binder is utilized in association with the high tensile strength materials and the high sonar transmission materials to form the composite. The binder can be any suitable relatively rigid binder which cures at a temperature below the melting point of the high sonar transmission material, e.g. below 250° F. when polyethylene is utilized. By the term a "relatively rigid" binder, it is meant that the tensile modulus thereof is greater than 50,000 psi and usually greater than 200,000 psi. The various epoxides can serve as effective relatively rigid binders and generally any conventional epoxy can be utilized as well as those known to the art and to the literature. The various conventional polyesters, the various conventional vinyl esters, and the like, can also be utilized as well as other types of relatively rigid binders which are known to the art as well as to the literature which have the above tensile modulus. The binders generally will adhere to the high strength material but not necessarily to the high sonar transmission material. Nevertheless, a strong composite is produced.

The composite formed by the high sonar transmission material, the binder, and the high strength material can generally be in any form or arrangement. For example, sheets of the high strength material can be utilized bonded to sheets of the high strength material. Alternatively and preferably, one or more layers of weaves, that is woven fibers, of the high sonar transmission material, can be bound to one or more layers of weaves of the high strength material as in a cluster arrangement. Still another alternative is the utilization of layers of one or more weaves containing fibers of both the high sonar transmission materials and the high strength materials. Regardless of the particular form or arrangement of the various materials forming the composite, an effective amount of the high sonar transmission material is utilized so that a nominal ¼ inch thick composition has an overall sound level loss of 4 decibels or less, desirably 3 decibels or less, and preferably 2 decibels or less, at a frequency of about 100 kilohertz. According to the present invention, it has been unexpectedly found that when low amounts of a high sonar transmission material, such as polyethylene, is utilized, unproportionally high sonar transmission rates are nevertheless achieved. Thus, the amount of the high sonar transmission material can range from about 10 percent to about 90 percent, desirably from about 25 percent to about 80 percent by volume based upon the total volume of the high sonar transition material as well as the high strength material. The amount of the high strength material is naturally the difference. The amount of binder can generally range from about 30 percent to about 70 percent and preferably from about 40 precent to about 60 percent by volume based upon the total volume of the binder as well as the high sonar transmission material and the high strength material. The amount of the high strength material and the high sonar transmission material is the difference.

As noted above, the composites of the present invention have good flexure strength and fatigue resistance with respect to temperature inasmuch as the high sonar transmission material such as polyethylene shrinks upon heating whereas the high strength material such as fiberglass will expand upon heating. Thus, the composites of the present invention have good all weather capabilities.

The composites of the present invention can be utilized in structures to house sonar emitting equipment, for example in sonar domes, radomes, etc., and have good physical properties such as tensile strength, flexural strength, flexural modulus, compression strength, compression modulus, and the like. The tensile strength of the composite is at least 100,000 PSI and preferably at least 150,000 PSI whereas the flexural strength of the composite is generally at least 7,000 PSI, desirably at least 15,000 PSI, and preferably at least 20,000 PSI. The flexural modulus of the composite is generally at least 700,000, desirably at least 1,500,000, and preferably at least 2,500,000. The compression strength of the composite is generally at least 6,000 PSI, desirably at least 14,000 PSI, and preferably at least 20,000 PSI. The compression modulus of the composite is at least 500,000, desirably at least 1,300,000, and preferably at least 2,000,000.

The present invention will be better understood by reference to the following examples.

EXAMPLE 1

Spectra-1000 or Spectra-900 (polyethylene manufactured by Allied Corporation, Morristown, N.J.) and S-2 glass (fibergalss manufactured by Owens Corning Fiberglass Corp., Toledo, Ohio) fibers were woven in a plain weave. Volume fractions of polyethylene (Spectra-1000) to S-2 glass fibers were kept at 25.0 percent. The fabric was impregnated with epoxy resin of the following composition.

| | |
|---|---|
| 1. Kelpoxy, G293, from NL Industries containing (carboxyl terminated butadiene nitrile reactive liquid elastomers from B. F. Goodrich). | 77.5 parts |
| 2. 40 percent terminated butadiene nitrile reactive liquid elastomers manufactured by B. F. Goodrich, 60 percent Epon-828 (an epoxy resin manufactured by Shell) | 37.5 parts |
| 3. Dicyandiamide from Omicron Chemical, Inc. | 6.0 parts |
| 4. Fikure 62-U, a curing agent, from Fike Chemicals | 2.0 parts |
| | 123.0 parts |

The fabric was impregnated with the above formulation using a paint brush. The resin content was 50 percent by volume based upon the total volume of the glass fibers, the polyethylene fibers, and the resin. The prepreg was B-staged for 25 minutes at 245° F. in an air circulating oven. 6"×6"plies were cut and stacked in a mold. Enough plies were cut to give cured laminate of ¼" nominal thickness. The laminate was cured in a heated mold in a hydraulic pressure under 60 PSI and 250° F. for 2 hours. The laminate was then cooled to room temperature. Acoustic and mechanical testing were conducted on this laminate.

EXAMPLE 2

Insertion loss was measured by passing acoustic waves of a known frequency. Table I gives insertion loss as a function of excitation frequency.

TABLE I

| Insertion Loss of Spectra-1000/S-2 Glass Composites | |
|---|---|
| Test Frequency | Insertion Loss |
| KHZ | db |
| 100 | 3.71 |
| 200 | 2.16 |
| 400 | 5.02 |

EXAMPLE 3

Test specimens were machined from a laminate prepared in a manner as set forth in Example 1. Flexural propeties (modulus and strength) were measured using four point flexural test per test method ASTM-D790. Table II gives flexural properties.

TABLE II

| Flexural Properties of Spectra-1000/S-2 Glass Hybrid Laminate | |
|---|---|
| Sample Prepared Under Example 1 | Average Flexural Modulus | Average Flexural Strength |
| | PSI | PSI |
| | 5.1 × 10⁶ | 39,236 |

It can thus be seen that the composite of the present invention has high flexural strengths and modulus.

EXAMPLE IV

The fabric volume frction of Spectra-1000 (polyethylene) was increased to 73 percent. A laminate was prepared according to Example 1. Acoustic measurements (Insertion Loss) are given in Table III.

TABLE III

| Insertion Loss of Spectra-1000/S-2 Glass Composites | |
|---|---|
| Test Frequency, KHZ | Insertion Loss, db |
| 100 | 1.51 |
| 200 | 2.66 |
| 400 | 4.50 |

TABLE IV

| Spectra-1000/S-2 Glass Hybrid Laminate | | |
| --- | --- | --- |
| Sample Prepared Under Example V | Average Flexural Modulus | Average Flexural Strength |
| | PSI $2.0 \times 10^6$ | PSI 13,774.0 |

As apparent from the above Example, a high volume of polyethylene, that is 73 percent, resulted in the flexural modulus and the flexural strength being drastically reduced.

EXAMPLE 5

Spectra-1000 laminates (no glass fiber), that is 100 percent by volume of polyethylene, were prepared according to procedure described in Example 1. Acoustic measurements (insertion loss) are listed in Table VII. Flexural properties are given in Table VIII.

TABLE V

| Insertion loss (Decibels) of Spectra-1000/Epoxy Laminates | |
| --- | --- |
| Test Frequency KHZ | Insertion Loss, db |
| 100 | 0.2 |
| 200 | 1.2 |
| 400 | 1.1 |

TABLE VI

| Flexural Properties of Spectra-1000/Epoxy Laminates | | |
| --- | --- | --- |
| Sample Made in Example VI | Flexural Modulus | Flexural Strength |
| | PSI $0.63 \times 10^6$ | PSI 5,160.0 |

This Example thus shows that a laminate made solely of polyethylene results in good sonar transmission but has poor flexural modulus and good flexural strength.

EXAMPLE 6

S-2 glass and Spectra-1000 plies were combined in a laminate interspersed and clustered sequence, i.e., Spectra-1000/epoxy plies alternated with S-2 glass/epoxy plies or Spectra-1000/epoxy plies were clustered followed by a cluster of S-2 glass/epoxy plies.

Acoustic and flexural properties are listed in the following tables.

TABLE VII

| Acoustic properties of interspersed and clustered Hybrid (Spectra-1000/S-2 Glass) Plies | | |
| --- | --- | --- |
| Test Frequency KHZ | Stacking Sequence | Insertion Loss db |
| 100 | Interspersed | 2.18 |
| 400 | Interspersed | 3.17 |
| 100 | Clustered | 3.4 |
| 400 | Clustered | 9.47 |

TABLE VIII

| Flexural Properties of Spectra-1000/S-2 Glass Hybrid Laminates | | | |
| --- | --- | --- | --- |
| Samples Made In Example 7 | Stacking Sequence | Flexural Modulus PSI | Flexural Strength PSI |
| | Interspersed | $1.7 \times 10^6$ | 20,361 |
| | Clustered | $0.875 \times 10^6$ | 20,707 |

As a control, 50 percent by volume of Spectra1000 glass fibers was used without any high sonar transition material such as polyethylene fibers. An epoxy in an amount of 50 percent by volume was utilized and a weave was prepared in a manner as set forth in Example 1. When tested for insertion loss, a value of 7.35 decibels was obtained. In comparison, the composite of Example 1 which contained an overall polyethylene content of 12.5 percent by volume had an insertion loss at 100 kilohertz of 3.71. Such a value is far below the expected value of approximately 6.4. Similarly, the decibel loss of 1.51 obtained in Example 4 utilizing approximately 73 percent by volume of polyethylene as the fiber content, that is approximately 36 percent of the overall volume content, was well below the expected value of approximately 2.65 decibels. Hence, it should be apparent that synergistic results with regard to sonar loss are obtained utilizing small amounts of polyethylene in the overall formulation.

While in accordance with the patent statutes, the best mode and preferred embodiment has been set forth, the scope of the invention is not limited thereto, but rather by the scope of the attached claims.

What is claimed is:

1. A high sonar transmission composition, comprising:
   a plastic composite containing at least one layer of a low sound level loss material, at least one layer of a high tensile strength material, and a relatively rigid binder bonding said layers together, the amount of said low sound level loss material being an effective amount so that said composite has a sound level loss of about 4 decibels or less at 100 kilohertz.

2. A high sonar transmission composition according to claim 1, wherein said high tensile strength material has a strength of at least 200,000 PSI, and wherein the amount of said high tensile strength material is an effective amount to form a composite having a flexural strength of at least 7,000 PSI.

3. A high sonar transmission composition according to claim 2, wherein said low sound level loss material is polyethylene, or polytetrafluoroethylene, wherein said high tensile strength material is fiberglass, aramid, carbon filter, or graphite fiber, wherein said binder is an epoxy, a polyester, or a vinyl ester, wherein the amount of said low sound level loss material is from about 10 percent to about 90 percent by volume based upon the total volume of said low sound level loss material and said high tensile strength material, wherein the amount of said high tensile strength material is from about 10 percent to about 90 percnt by volume based upon the total volume of said low sound level loss material and said high tensile strength material, and wherein the amount of said binder is from about 30 percent to about 70 percent by volume based upon the total volume of said resin, said high tensile strength material, and said low sound level loss material.

4. A high sonar transmission composition according to claim 3, wherein said composite has a flexural strength of at least 15,000 PSI, and a flexural modulus of at least 1,500,000.

5. A high sonar transmission composition according to claim 4, wherein said low sound level loss material is a polyethylene having a molecular weight of at least 500,000, wherein said high tensile strength material is fiberglass, wherein said binder is epoxy, wherein the amount of said polyethylene is from about 25 percent to about 80 percent by volume, wherein the amount of said fiberglass is from about 20 percent to about 75 percent by volume, wherein the amount of said epoxy is from about 40 percent to about 65 percent by volume, wherein said composite has a flexural strength of at least 20,000 PSI and wherein said composite has a flexural modulus of at least 2,500,000.

6. A high sonar transmission composition according to claim 3, wherein said low sound level loss material is in the form of a fiber weave, wherein said high strength material is in the form of a fiber weave, wherein said binder bonds said low sound level loss fiber weave to said high strength fiber weave, and wherein said composite has a sound level loss of about 3 decibels or less.

7. A high sonar transmission composition according to claim 4, wherein said low sound level loss material is in the form of a binder-ply, wherein said high strength material is in a form of a binder ply.

8. A sonar dome made from the composition of claim 1.

9. A sonar dome made from the composition of claim 3.

10. A sonar dome made from the composition of claim 5.

11. A composite of high sonar transmission capabilities, comprising:
at least one layer of a high tensile strength material, at least one layer of a high sonar transmission material, and a binder bonding said tensile strength material layer and said high sonar transmission material layer, the amount of said high sonar transmission material being an effective amount so that said composite is capable of transmitting a high amount of sonar therethrough.

12. A composite according to claim 11, wherein said composite has a tensile strength of at least 1000,000 PSI.

13. A composite according to claim 12, wherein said composite has a sonar transmitting loss of about 4 decibels or less at a frequency of 100 kilohertz.

14. A composite according to claim 13, wherein said high sonar transmission material is polyethylene or polytetrafluoroethylene, wherein said high tensile strength material is fiberglass, aramid, carbon fiber, or graphite fiber, wherein said binder has a tensile modulus of at least 50,000 PSI, wherein the amount of said high sonar transmission material is from about 10 percent to about 90 percent by volume based upon the total volume of said high sonar transmission material and said high tensile strength material, wherein the amount of said high tensile strength material is from about 10 to about 90 percent by volume based upoon the total volume of said high sonar transmission material and said high tensile strength material, and wherein the amount of said binder is from about 30 percent to about 70 percent by volume based upon the total volume of said resin, said high tensile strength material, and said high sonar transmission material.

15. A composite according to claim 14, wherein said binder is an epoxy, a polyester, or a vinyl ester, wherein said composite has a tensile strength of at least 150,000 PSI, and wherein said composite has a sonar transmission loss of about 3 decibels or less at a frequency of 100 kilohertz.

16. A composite according to claim 11, wherein said high sonar transmission material is in the form of at least two binder-ply sheets clustered together.

17. A composite according to claim 14, wherein said high sonar transmission material is in the form of a woven fiber layer and wherein said high tensile strength material is in the form of a woven fiber layer.

18. A composite according to claim 14, wherein said high sonar transmission material and said layer of high tensile strength material are in the form of fibers woven into a single woven layer.

19. A sonar dome comprising the composition of claim 12.

20. A sonar dome comprising the composition of claim 15.

21. A high sonar transmission composition according to claim 6, wherein said layer of said low sound level loss material and said layer of said high tensile strength material are in the form of fibers woven into a single woven layer.

* * * * *